United States Patent [19]

Clark

[11] Patent Number: 4,795,129
[45] Date of Patent: Jan. 3, 1989

[54] NORMALLY CLOSED FLUID SWITCHING LOGIC ELEMENT

[76] Inventor: Richard J. Clark, 2719 Fort Worth St., Sarasota, Fla. 33581

[21] Appl. No.: 70,198

[22] Filed: Jul. 6, 1987

Related U.S. Application Data

[63] Continuation of Ser. No. 696,097, Jan. 29, 1985.

[51] Int. Cl.$^4$ .......................................... F16K 31/143
[52] U.S. Cl. ....................................... 251/62; 251/12; 137/87
[58] Field of Search ................... 251/62, 12, 63, 63.4, 251/63.5, 63.6; 137/87

[56] References Cited

U.S. PATENT DOCUMENTS 4,291,718 9/1981 Sanin et al. ................... 251/62 X
4,304,253 12/1981 Roger ............................. 251/62 X
4,391,293 7/1983 Keenan ........................... 251/62 X Primary Examiner—Larry Jones
Attorney, Agent, or Firm—Charles J. Prescott; Raymond H. Quist

[57] ABSTRACT

A normally closed fluid switching logic element has a plurality of radial ports to a first chamber. A poppet, connected to a piston within the element, moves between an open position off its poppet seat and a closed position. In the open position another port is provided to the first chamber permitting fluid flow. The poppet is biased to the closed position by a spring, but also by fluid pressure at either or both ports. The poppet may be displaced only by pressure in a second chamber behind the piston. In one configuration this opening pressure is provided from an external source. In other configurations, the opening pressure is derived from the first chamber, from the pressure outside the poppet and from either of these.

20 Claims, 2 Drawing Sheets 4,795,129

NORMALLY CLOSED FLUID SWITCHING LOGIC ELEMENT

This is a continuation of application Ser. No. 696,097 filed Jan. 29, 1985.

BACKGROUND OF THE INVENTION

This invention relates generally to a fluid valve and more particularly to a switching logic element having a normally closed characteristic.

Switching logic elements utilize an unbalanced poppet which is spring loaded on a seat; however, without additional fluid pressure to bias the poppet against the seat, flow can occur between the input and output ports. These valves are called "normally open" because of the need for fluid pressure to close them. The complementary logic element—normally closed—has not previously been available. Such a normally closed logic element would require a positive or pilot pressure input to be opened and to remain open.

The need for a pilot pressure is an operating requirement for fail safe applications, i.e. if the source of fluid pressure is cut off either inadvertently or because of system shut down, the valve should close to prevent loss of load supporting pressure by flow through the logic element.

SUMMARY OF THE INVENTION

A fluid logic element has a main fluid flow path between a central port having a poppet and seat closure, and a plurality of radial ports. The poppet is biased against the seat, not only by a spring, but also by fluid pressure applied at either or both ports. The poppet can be moved off its seat only by the application of fluid pressure in a chamber behind a piston connected to the poppet. This opening fluid pressure or pilot signal may be applied from a third port through the logic element body to the chamber from an independent third source, or derived through an orifice from the pressure at the radial ports or the central port by configuration modifications. When the opening pressure is derived from pressure at the radial ports or central port, it can be overridden by venting the chamber behind the piston through the third port which will cause the valve to close. A manual override configuration is also presented.

DETAILED DESCRIPTION OF THE INVENTION

Figure 1:
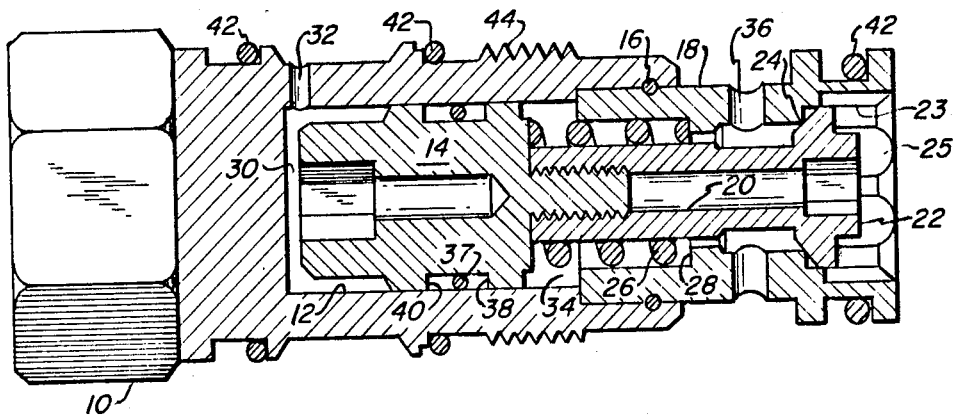
FIG. 1 is a cross-section of a normally closed fluid switching logic element in accordance with the invention.

Referring to FIG. 1, a normally closed fluid switching logic element will now be described. Although the specific configuration shown in FIG. 1 and other configurations described herein were designed and built for operation with hydraulic liquid, it should be recognized that other liquid or gas switching logic elements are also contemplated. Body 10 has a longitudinally extending bore 12 in which piston 14 is slidably supported. Body 10 has secured to it, by wire loop 16, extension 18. Wire loop 16 is used as the fastening device only by way of example, other fastening arrangements may also be used. Piston 14 has secured to it, e.g. by screw threads, extension 20 which includes poppet 22. In the position shown in FIG. 1, poppet 22 is held against seat 24 of extension 18 by spring 26. One end of spring 26 bears against shoulder 28 of extension 18, while the other end of spring 26 bears against one side of piston 14. Piston 14, and poppet 22, are consequently biased to force poppet 22 against seat 24 (to the left in FIG. 1).

In the configuration illustrated in FIG. 1, body 10 and one side of piston 14 form a variable volume chamber 30 with port 32 providing the only fluid passage to chamber 30. On the other side of piston 14 is variable volume chamber 34 which has a plurality of radially extending ports 36 through extension 18. Ports 36 are primary fluid ports. Poppet 22, when moved away from seat 24 (to the right in FIG. 1), provides a central port which is also a primary port communicating with chamber 34. Thus fluid will flow from radial ports 36 to the central port when poppet 22 is unseated, or will flow in the reverse direction depending on which pressure is higher.

As is customary with fluid handling elements, O-ring 37, positioned between shoulders 38 and 40 provides a seal between variable volume chambers 30 and 34.

It will be observed that fluid pressure applied to the outer side of poppet 22 will tend to force it against seat 24 rather than tend to open it. Also, fluid pressure within variable volume chamber 34 will also tend to force poppet 22 against seat 24 because of the greater area of piston 14 exposed to this pressure when compared with the area of poppet 22 exposed to this pressure. Thus logic element closing forces will be exerted by both these pressures and spring pressure. It will be appreciated by those skilled in the art that these forces can be modified by changing differential areas and springs. Also, it will be recognized that friction forces which must be overcome may be significant due to the close fits and seals used to prevent leakage, although some currently available seal elements may reduce friction to a negligible force.

The logic element of FIG. 1 can only be opened by applying fluid pressure in variable volume chamber 30 through port 32 of an amount sizable enough to overcome the closing forces discussed above. Moreover, if this opening pressure drops, poppet 22 will reseat, thereby preventing fluid from moving between ports 36 and the central poppet port.

The normally closed fluid switching logic element of FIG. 1 and the alternate configurations still to be described, have exterior body configurations which facilitate their mounting within a manifold to thereby become components in a fluid circuit. The operating modes and principles are equally applicable to other uses which may require different exterior body configurations. Since these exterior body features are not part of the present invention and are similar or identical to those skilled in the art, no detailed discussion of these will be presented. O-rings 42, which may be supplemented by additional seals such as sacrificial seals, are located at positions where sealing is required with shoulders adjacent to them to restrict axial movement. Threads 44 have been provided for mounting as mentioned above.

Figure 2:
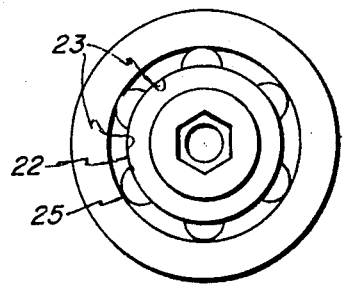
FIG. 2 is a detail of an end view of the logic element of FIG. 1.

Referring to FIG. 2, the outer circumference of poppet 22 (which can be seen in FIG. 1 to extend axially for a short distance) is guided and supported when it moves outwardly off its seat on lands 23 which are interspaced with axially extending grooves 25. This arrangement provides free flow of fluid through the central port while still maintaining poppet 22 in correct alignment.

Figure 3:
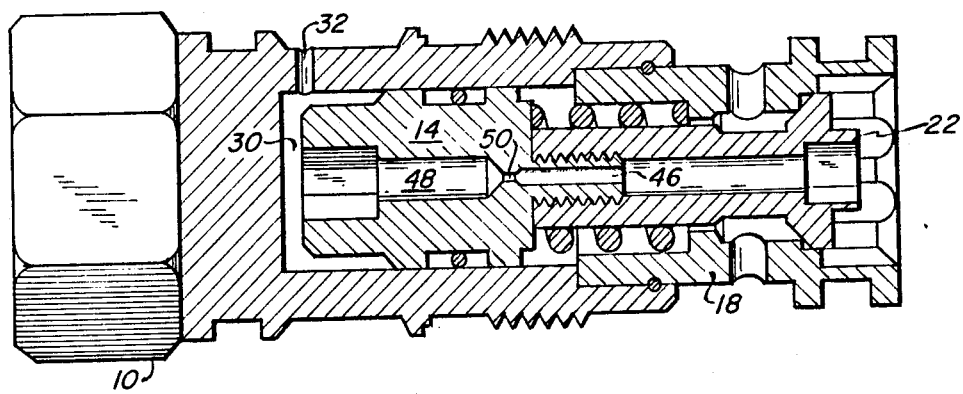
FIG. 3 is an alternate embodiment in cross-section having the pilot pressure derived from the pressure applied at the central port.

Referring now to FIG. 3, an alternate embodiment of the normally closed fluid switching logic element of FIG. 1 will be described. Body 10 and its extension 18 remain the same as in FIG. 1. Passage 46, however, is provided in this embodiment between cavity 48 (which extends from variable volume chamber 30) and the central opening in poppet 22. Orifice 50 is located in passage 46 to produce a pressure drop so that the pressure in chamber 30 will be somewhat less than the pressure outside poppet 22. With passage 32 closed and the pressure outside poppet 22 rising, a pressure will be reached which will cause piston 14 to move and poppet 22 to open. Thus the pressure outside poppet 22 provides the pilot signal or pressure to open the poppet port. When passage 32 is opened the fluid in chamber is vented and poppet 22 will close.

Figure 4:
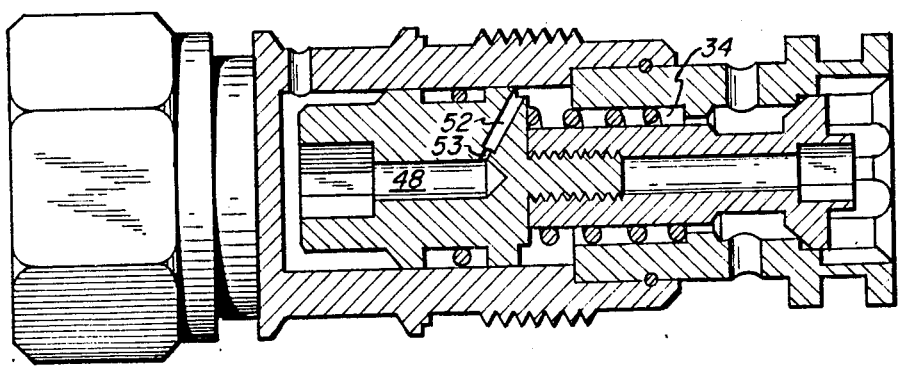
FIG. 4 is an alternate embodiment in cross-section having the pilot pressure derived from the pressure applied at the radial ports.

FIG. 4, is an alternate embodiment of the normally closed fluid switching logic element of FIG. 1 with the pilot signal in this case derived from the pressure in variable chamber 34. The only change from the FIG. 1 embodiment is the addition of passage 52 containing orifice 53 which extends between cavity 48 and variable volume chamber 34. The FIG. 4 embodiment provides a logic element which remains closed until the pressure in variable volume chamber 34 rises high enough so that the resulting pressure in variable volume chamber 30 causes poppet 22 to open. This pressure will rise only if passage 32 is closed, and poppet 22 will reclose if passage 32 is opened to relieve the pressure in chamber 30.

Figure 5:
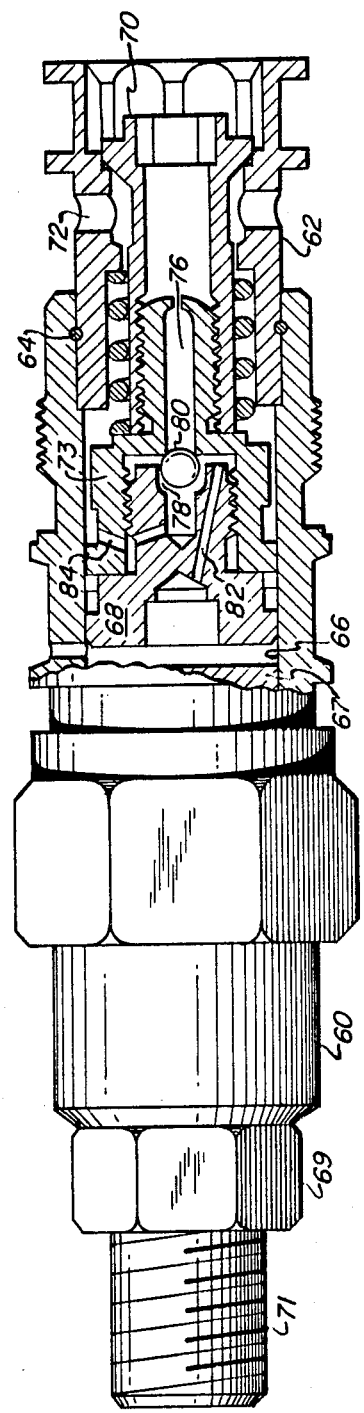
FIG. 5 is an alternate embodiment in cross-section having a manual over-ride feature and a structure in which pilot pressure is derived from either radial ports or the central port.

FIG. 5 discloses additional features which can be used with the basic normally closed fluid switching logic element of FIG. 1 to provide other capabilities. Element body 60 has secured to it extension 62 using wire loop 64 (the use of a wire loop is only exemplary of one way in which they may be secured). Body 60 has a longitudinally extending bore 66 in which piston 68 is slidably supported. Also contained in bore 66 is manual adjusting base 67 which can be screwed in by loosening lock nut 69 and turning threaded end 71 to move from the position shown in FIG. 4 to a position in which it will force piston 68 to the right (as shown in FIG. 4). As with the previous embodiments, piston 68 is connected to poppet 70, so that moving piston 68 to the right will unseat poppet 70 and open the element for flow between radial ports 72 and the central port about the periphery of poppet 70. (An intermediate element 73 is illustrated which is secured between piston 68 and poppet 70, in this example by threads. Element 73 is fabricated as a separate item for facilitating manufacturing, but the element functions as if piston 68 and poppet 70 were the same piece.) This manual adjusting feature over-rides the normal need for a fluid pressure signal in chamber 74 before fluid will flow through the element; however, the manual over-ride may also be used to create only a slight flow, with a pressure signal to chamber 74 causing full opening of the central port by displacement of poppet 70.

The FIG. 5 embodiment also incorporates two tortuous passages to chamber 74. One passage 76 extends centrally from the bore through poppet 70 to chamber 78 which contains ball 80. Chamber 78 is connected by passage 82 to chamber 74. Another passage 84 extends from variable chamber 86 to chamber 78. Ball 80 will assume a position to block either passage 76 or passage 84 in favor of the passage having the higher fluid pressure. As a consequence, a pilot signal to open poppet 70 may be derived from fluid pressure at poppet 70 or at ports 72.

All of the embodiments of the invention provide a normally closed fluid switching logic element which will interrupt fluid flow between two ports unless a pilot pressure signal of sufficient magnitude is provided to open the fluid passage.

Although normally closed fluid switching logic elements in accordance with the invention have been illustrated and described, it will be evident that changes and modifications can be made without departing from the spirit of the invention and the scope of the appended claims.

I claim:

1. A normally closed fluid switching logic element having open and closed positions for controlling flow of fluid therethrough, said logic element requiring the presence of a pilot pressure in a pilot pressure chamber for fluid flow and said logic element having a body adapted for receiving different piston assemblies for providing the pilot pressure by different modes, comprising:

a body having a longitudinally extending bore therein, said bore open at one end and closed at the other end;

a poppet seat at said open end of said bore;

a shoulder extending radially inwardly from said body into said bore;

a piston assembly having:

a piston slideably and sealingly supported in said bore;

said piston having first and second ends;

a stem extending from said second end of said piston to a distal end;

said stem having a poppet disposed at said distal end;

said poppet having a closed position when it is positioned against said poppet seat, said closed position defining said logic element closed position;

said poppet having an open position when it is displaced from said poppet seat, said open position defining said logic element open position;

a spring having one end positioned against said second end of said piston;

said spring having a second end positioned against said shoulder, whereby said spring biases said poppet against said poppet seat;

a first primary fluid port formed by said poppet and said poppet seat when said poppet is displaced from said poppet seat;

a first variable volume chamber defined by said second end of said piston, said body, said stem and said poppet;

a second primary fluid port extending from said first variable volume chamber through said body;

a second variable volume pilot pressure chamber defined by said closed end of said bore, said body and said first end of said piston; and a third pilot pressure regulating fluid port extending from said second variable volume pilot pressure chamber through said body for regulating the pilot pressure in said second variable volume pilot pressure chamber.

2. A normally closed fluid switching logic element in accordance with claim 1, further including:

a passage from said second variable volume pilot pressure chamber through said poppet; and said passage including a restricted orifice portion, whereby a pressure at said poppet will produce a pilot pressure in said second variable volume pilot pressure chamber.

3. A normally closed fluid switching logic element in accordance with claim 1, further including:

a passage from said second variable volume pilot pressure chamber to said first variable volume chamber; and said passage including a restricted orifice portion, whereby a pressure in said first variable volume chamber will produce a pilot pressure in said second variable volume pilot pressure chamber.

4. A normally closed fluid switching logic element in accordance with claim 1, further including:

adjustable means mounted in said body for moving said poppet a desired distance off said poppet seat.

5. A normally closed fluid switching logic element in accordance with claim 1, further including:

a passage from said second variable volume pilot pressure chamber through said poppet;

a passage from said second variable volume pilot pressure chamber to said first variable volume chamber; and means closing one of said passages in response to opening of the other, whereby a pressure at said poppet or a pressure in said first variable volume chamber will produce a pilot pressure in said second variable volume pilot pressure chamber.

6. A normally closed fluid switching logic element in accordance with claim 5, wherein:

said passages connect with a common chamber; and said means closing one of said passages in response to opening of the other is a ball in said common chamber.

7. A normally closed fluid switching logic element having open and closed positions for controlling flow of fluid therethrough and requiring the presence of a pilot pressure in a pilot pressure chamber for fluid flow comprising:

a body having a longitudinally extending bore therein, said bore open at one end and closed at the other end;

a poppet seat at said open end of said bore;

a piston slideably and sealingly supported in said bore;

said piston having first and second ends;

a stem extending from said second end of said piston to a distal end;

said stem having a poppet disposed at said distal end;

said poppet having a closed position when it is positioned against said poppet seat, said closed position defining said logic element closed position;

said poppet having an open position when it is displaced from said poppet seat, said open position defining said logic element open position;

a spring having one end positioned against said second end of said piston;

a shoulder extending radially inwardly from said body into said bore;

said spring having a second end positioned against said shoulder;

said spring biasing said poppet against said poppet seat;

a first primary fluid port formed by said poppet and said poppet seat when said poppet is displaced from said poppet seat;

a first variable volume chamber defined by said second end of said piston, said body, said stem and said poppet;

a second variable volume pilot pressure chamber defined by said closed end of said bore, said body and said first end of said piston;

a second primary fluid port extending from said first variable volume chamber through said body; and a third pilot pressure regulating fluid port extending from said second variable volume pilot pressure chamber through said body for regulating the pilot pressure in said second variable volume pilot pressure chamber.

8. A normally closed fluid switching logic element in accordance with claim 7, further including:

a passage from said second variable volume pilot pressure chamber through said poppet; and said passage including a restricted orifice portion.

9. A normally closed fluid switching logic element in accordance with claim 7, further including:

a passage from said second variable volume pilot pressure chamber to said first variable volume chamber; and said passage including a restricted orifice portion.

10. A normally closed fluid switching logic element in accordance with claim 7, wherein:

piston and poppet areas exposed in said first variable volume chamber with said poppet in closed position are such that fluid pressure applied with said first variable volume chamber tends to keep said poppet in said closed position.

11. A normally closed fluid switching logic element in accordance with claim 7, further including:

adjustable means mounted in said body for moving said poppet a desired distance off said poppet seat.

12. A normally closed fluid switching logic element in accordance with claim 7, further including:

a passage from said second variable volume pilot pressure chamber through said poppet;

a passage from said second variable volume pilot pressure chamber to said first variable volume chamber; and means closing one of said passages in response to opening of the other.

13. A normally closed fluid switching logic element in accordance with claim 12, wherein:

said passages connect with a common chamber; and said means closing one of said passages in response to opening of the other is a ball in said common chamber.

14. A normally closed fluid switching logic element having open and closed positions for controlling flow of fluid therethrough, said logic element requiring the presence of a pilot pressure in a pilot pressure chamber for fluid flow comprising:
- a body having a longitudinally extending bore therein, said bore open at one end and closed at the other end;
- a body extension having a longitudinal passage therethrough and first and second ends;
- said first end of said body extension connected to said body at said open end of said bore;
- said body extension having a poppet seat formed at said second end and a plurality of lands and grooves extending longitudinally from said poppet seat;
- a shoulder extending radially inwardly from said body extension into said longitudinal passage therethrough;
- a piston slideably and sealingly supported in said bore;
- said piston having first and second ends;
- a piston extension secured to said second end of said piston having having a poppet disposed at the distal end thereof slideably mounted on said lands;
- said poppet having a closed position when it is positioned against said poppet seat, said closed position defining said logic element closed position;
- said poppet having an open position when it is displaced from said poppet seat, said open position defining said logic element closed position;
- a spring positioned between said shoulder of said body extension and said second end of said piston;
- said spring biasing said poppet against said poppet seat;
- a first chamber defined by said second end of said piston, said body, said body extension, said piston extension and said poppet;
- a second pilot pressure chamber defined by said closed end of said bore, said body and said first end of said piston;
- a first primary fluid port formed by said poppet and said poppet seat when said poppet is displaced from said poppet seat;
- a second primary fluid port extending radially from said first chamber through said body extension; and
- a third pilot pressure regulating fluid port extending from said second pilot pressure chamber radially through said body for regulating the pilot pressure in said second pilot pressure chamber.

15. A normally closed fluid switching logic element in accordance with claim 14, further including:
   threads on the exterior of said body to secure it in a receptacle.

16. A normally closed fluid switching logic element in accordance with claim 14, further including:
   a passage from said second pilot pressure chamber through said poppet; and
   said passage including a restricted orifice portion.

17. A normally closed fluid switching logic element in accordance with claim 14, further including:
   a passage from said first chamber to said second pilot pressure chamber; and
   said passage including a restricted orifice portion.

18. A normally closed fluid switching logic element in accordance with claim 14, further including:
   adjustable means mounted in said body for moving said poppet a desired distance off said poppet seat.

19. A normally closed fluid switching logic element in accordance with claim 14, further including:
   a passage from said second pilot pressure chamber through said poppet;
   a passage from said second pilot pressure chamber to said first chamber; and
   means closing one of said passages in response to opening of the other.

20. A normally closed fluid switching logic element in accordance with claim 19, wherein:
   said passages connect with a common chamber; and
   said means closing one of said passages in response to opening of the other is a ball in said common chamber.

* * * * *

UNITED STATES PATENT AND TRADEMARK OFFICE
CERTIFICATE OF CORRECTION

PATENT NO. : 4,795,129
DATED : January 3, 1989
INVENTOR(S) : Richard J. Clark

It is certified that error appears in the above-identified patent and that said Letters Patent is hereby corrected as shown below:

On the title page Insert

--(73) Assignee: Sun Hydraulics Corp.,
    Sarasota, FL --.

Signed and Sealed this

Fourth Day of July, 1989

*Attest:*

DONALD J. QUIGG

*Attesting Officer*     *Commissioner of Patents and Trademarks*